Nov. 22, 1927.
A. A. COATON
1,650,492
ROCK DRILL BIT
Filed Nov. 11, 1926
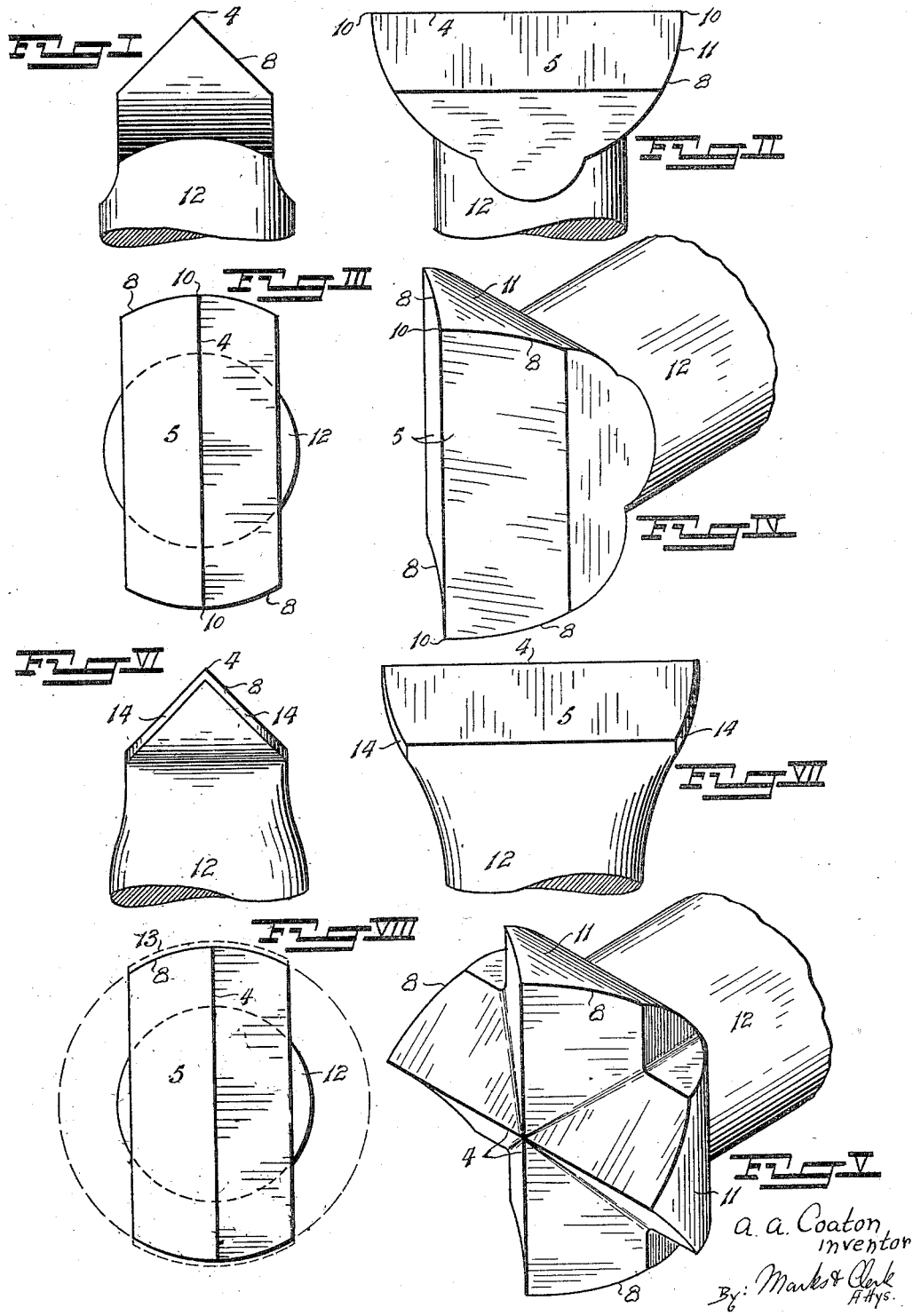
a. a. Coaton
Inventor
By: Marks & Clerk
Attys.

Patented Nov. 22, 1927.

1,650,492

UNITED STATES PATENT OFFICE.

ARTHUR ALLAN COATON, OF SPRINGS, SOUTH AFRICA.

ROCK-DRILL BIT.

Application filed November 11, 1926, Serial No. 147,785, and in the Union of South Africa January 5, 1926.

This invention refers to percussive rock drill tools in which the transverse cutting edge is formed by the intersection of bevel surfaces and in which the lateral edges of said bevel surfaces are coincident with a cylinder coaxial with the drill, so that, being everywhere at one radial distance from the drill axes, they form true reaming edges.

The invention is illustrated in the accompanying drawings, in which

Figs. I, II and III are respectively a side elevation, front elevation and plan of a rock drill tool embodying the invention.

Fig. IV is a perspective view of the same tool.

Fig. V is a similar view of another form of tool. Figs. VI, VII and VIII show a modification of the tool illustrated in Figs. I to IV.

The type of tool to which the invention refers comprises a stem 12, at the cutting end of which is formed a wing (or several wings) terminating in inclined faces 5 which meet to form the transverse cutting edge 4. Each lateral surface 11 of the bevelled end of the wing is so shaped that the edges 8 formed by its intersections with the faces 5 lie on a cylinder coaxial with the tool.

According to this invention said surface 11 is formed as a portion of a cylinder the axis of which is perpendicular to the axis of the tool. It is desirable that a diameter of such cylinder should coincide with the cutting edge 4; and it is further desirable that the diameter of such cylinder should be equal to the diameter of the tool over the points 10.

Figs. I to IV show the invention carried out in a chisel end forged from the drill stem 12. In these figures 4 is the cutting edge and 8 the reaming edges of the wing. Fig. V shows the more commonly used cruciform tool having two such wings at right angles to one another.

The tools shown in Figs. I to V have complete clearance away from the reaming edges; but it is sometimes desirable, especially when the tool is to be used in hard rock, to employ a modified form which effects a compromise in the matter of clearance, with the object of maintaining the gauge of the tool for longer periods.

With this object the drill wing is first forged to the form previously described, but—as indicated by the dotted lines 13 in Fig. VIII—to a rather greater diameter than the desired finished diameter. The tool is thereafter squeezed to final dimensions in a cylindrical die co-axial with the tool and of the desired finished diameter of the tool. The effect is to form, adjacent to the reaming edges 8, cylindrical areas 14 shown in Figs. VI and VII which may be regarded as part of the surface of cylinder 2. These surfaces take the wear on the side of the bit and protect the edges 8; and if they are kept small, they do not materially detract from the freedom of the tool to move in the bore hole.

I claim:—

1. A percussive rock drill tool the cutting end of which is defined by faces sloped to the axis of the tool and intersecting to form a transverse cutting edge, and by lateral surfaces of cylindrical form, the axial direction of which is perpendicular to the tool axis.

2. A percussive rock drill tool the cutting end of which is defined by faces sloped to the axis of the tool and intersecting to form a transverse cutting edge, and by lateral surfaces of cylindrical form, having a diameter coincident with the cutting edge and having their axial direction perpendicular to the tool axis.

3. A percussive rock drill tool the cutting end of which is defined by faces sloped at 45 degrees to the axis of the tool and intersecting to form a transverse cutting edge, and by lateral cylindrical surfaces of the same diameter as the cutting edge having their axis perpendicular to the axis of the tool and having a diameter coincident with the cutting edge.

4. A percussive rock drill tool the cutting end of which is defined by faces sloped to the axis of the tool and intersecting to form a transverse cutting edge, and by lateral surfaces of cylindrical formation the axial direction of which is perpendicular to the tool axis, and also by cylindrical surfaces coaxial with the tool and of the same diameter as the cutting edge and including the lateral edges of the sloped faces.

In testimony whereof I affix my signature.

ARTHUR ALLAN COATON.